United States Patent [19]

Hennington

[11] Patent Number: 4,758,047

[45] Date of Patent: Jul. 19, 1988

[54] SPEAKER EQUIPPED HEADREST

[76] Inventor: Jeffrey K. Hennington, 3737 SW. 117th Ave. - Space 22, Beaverton, Oreg. 97005

[21] Appl. No.: 37,822

[22] Filed: Apr. 13, 1987

[51] Int. Cl.⁴ ............................................ A47C 1/10
[52] U.S. Cl. ................................. 297/397; 297/217; 297/391
[58] Field of Search ............... 297/397, 407, 410, 217; 297/397

[56] References Cited

U.S. PATENT DOCUMENTS 3,385,393   5/1968   Gold ..................................... 297/397
4,440,443   4/1984   Nordskog ............................. 297/397

FOREIGN PATENT DOCUMENTS 1084948   9/1967   United Kingdom ................ 297/397

Primary Examiner—James T. McCall

[57] ABSTRACT

A headrest attachable to vehicle seat structure and including one or more speakers located at the ends of the headrest. A main base member of the headrest receives the speakers in recessed areas while a headrest cover encloses the speakers and main body. Removable attachment to seat structure is by means of a strap.

1 Claim, 1 Drawing Sheet

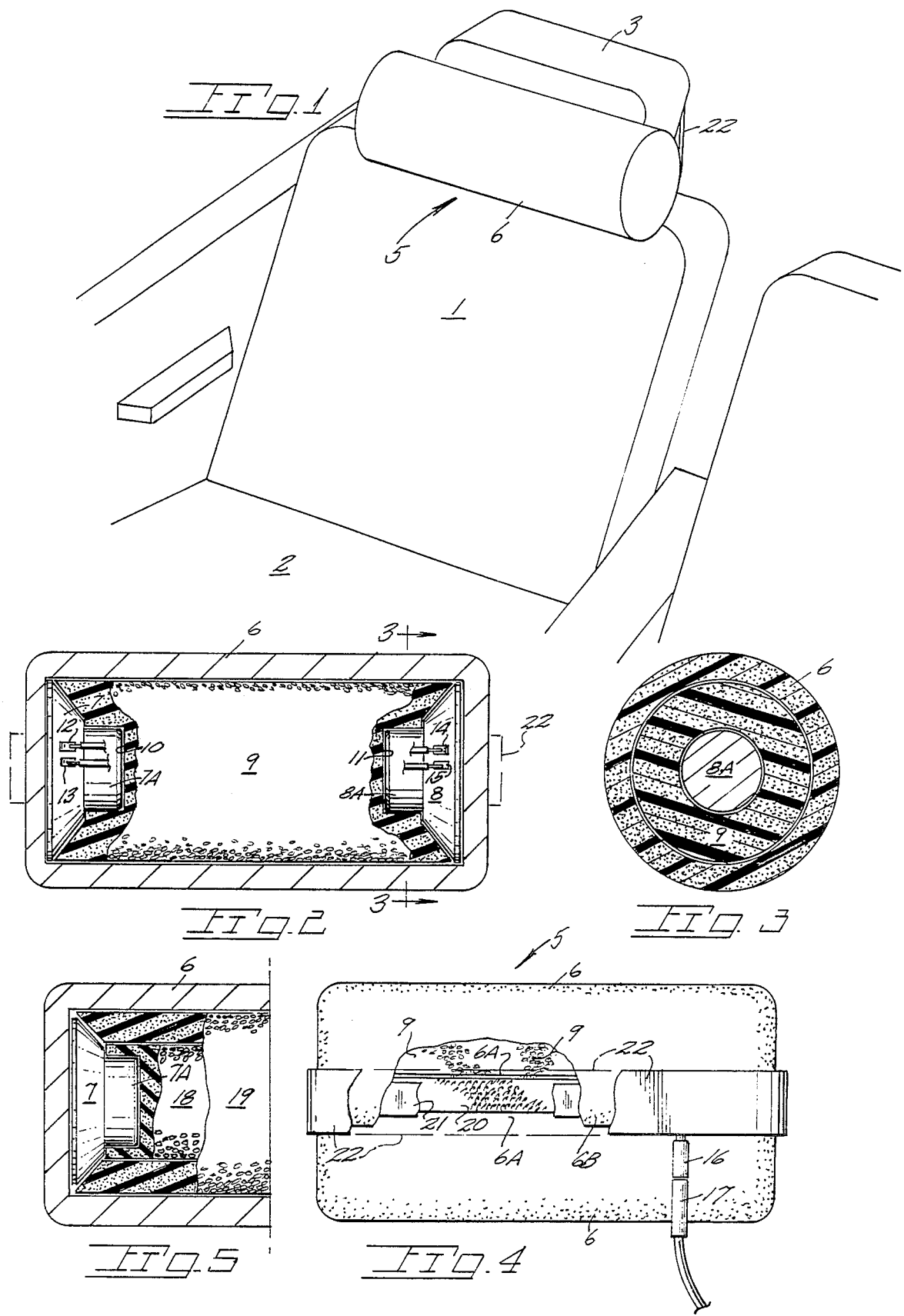

SPEAKER EQUIPPED HEADREST

BACKGROUND OF THE INVENTION

The present invention concerns headrests for use in conjunction with the upper portion of a seat back.

In current automotive type seats the uppermost portion of the seat back constitutes or supports a headrest. Such a headrest supports the head of the occupant against sudden and injurious displacement in the event of a crash. Some headrests are supported in an adjustable manner but are considered integral or part of the seat back structure. As presently understood such headrests are not speaker equipped.

U.S. Pat. No. 4,154,478 is of some interest in that it shows a pair of lateral supports on a seat engaging strap with each support located at the side of the user's head to support same against lateral movement. Each support may be equipped with a speaker.

SUMMARY OF THE PRESENT INVENTION

The present invention is embodied in a detachable or auxiliary headrest which includes speaker means.

The headrest has a base which positions speakers so as to generate sound waves in the proximity of the user's ears without blocking out extraneous sound waves. In an effort to increase the quality of sound it has become popular to wear lightweight headphones. As wearing same during operation of a vehicle may obscure ambient sounds, safe vehicle operation is jeopardized. Some governmental units have enacted ordinances and statutes against such headphone use. Conventional speaker installation in a vehicle results in the driver's hearing being impaired by speaker volume being at that level desired by the vehicle passengers as opposed to each passenger and driver regulating the volume as desired.

The headrest supports one or more speakers in circuit with a signal source such as the vehicle radio, tape or disc player, portable radio and the like. Provision is made for detachable securement to the seat back to permit secure stowage of the headrest when not in use as for example in the vehicle trunk. The speakers are offset from the person by an expanse of base member material. The headrest is of a size and shape to support the user's neck and head and attachment means for engagement with the seat back or existing headrest of the auto. Speaker means are at least partially supported by a base member which may include a resilient component.

As certain makes and models of speakers are costly and are often stolen, along with the radio and tape equipment with damage occurring to the speaker mounting structure of the vehicle, it is desirable to mount the speaker in a detachable manner.

The present invention combines a headrest for support of the user's neck and head while providing a concealed base member for speaker means. The headrest is equipped with attachment means which permits convenient installation and removal from a seat back.

Important objectives include the provision of a headrest and speaker combination that provides sound reproduction without blocking out sound waves from other sources which contribute to safe vehicle operation such as for example police and fire sirens; the provision of a headrest speaker combination which permits convenient detachment from the auto for storage in a vehicle trunk or other lockable compartment; the provision of a combination speaker and headrest which provides a sound source in proximity of the listener's ears without obstructing vision or extraneous sounds such as speech, vehicle sounds or alarm signals; the provision of a combination headrest and speaker which is located in an unobtrusive manner.

BRIEF DESCRIPTION OF THE DRAWINGS

In the drawings:

FIG. 1 is a perspective view of an automotive type seat with the present speaker equipped headrest thereon;

FIG. 2 is a longitudinal vertical sectional view of the headrest;

FIG. 3 is a vertical sectional view taken along line 3—3 of FIG. 2;

FIG. 4 is a rear elevational view of the headrest; and

FIG. 5 is a vertical sectional view of a modified headrest broken away at a vertical centerline.

DETAILED DESCRIPTION OF THE PREFERRED EMBODIMENTS

With continuing attention to the drawings wherein applied reference numerals indicate parts similarly hereinafter identified, reference numeral 1 indicates the frontal surface of a seat back of an automotive type seat having a seat bottom at 2. It is understood that such seat structure may be found other than in automobiles, as for example buses, aircraft and boats.

The seat back is provided with an upper extension at 3 to normally support the occupant's head. Extension 3 may be part of the seat back or supported on a vertically adjustable standard not shown. Typically such upper extensions 3 are of lesser width than the seat back.

The present combination headrest and speaker is indicated generally at 5. A headrest cover is at 6 and may be of any attractive, durable material to best serve practical and aesthetic purposes.

Interiorly of the cover are speaker means preferably speakers 7 and 8 located at opposite ends of an elongate base member 9. The magnet housings at 7A and 8A of the speakers are at least partially supported by base member 9. For this purpose the base member may define recessed areas 10 and 11. Cover 6 confines the speakers securely in place. Terminals 12-13 and 14-15 on the speakers receive leads which terminate at a jack 16 which receives a multi-conductor plug 17 in circuit with a signal source. Obviously various electrical components may be utilized for sound control.

Base member 9 may be of a resilient material and formed as a unitary structure or as shown in FIG. 5 a two part structure of different resiliency material for example having an inner component 18 and a polyurethane foam sleeve 19 outer component of different resiliency.

With attention again to cover 6, the same may have lengthwise overlapped marginal areas at 6A-6B extending the cover length. If desired, fabric closure strips of the hook and loop type at 20 and 21 may be applied to the opposing surfaces of the marginal area.

Attachment means are embodied in a seat engaging strap member 22 suitably joined with the cover extremities as by stitching.

The speakers 7 and 8 may be of the wireless type energized by signals from a remote transmitter unit in the vehicle and powered by the vehicle electrical system. Such speakers, as well as such transmitter units, are known in the sound reproduction art and accordingly need not be elaborated upon.

While I have shown but a few embodiments of the invention, it will be apparent to those skilled in the art that the invention may be embodied still otherwise without departing from the spirit and scope of the invention.

Having thus described the invention, what is desired to be secured in a Letters Patent is:

I claim:

1. A speaker equipped headrest for attachment to the front surface of an automobile seat and comprising in combination, a resilient base member having a curved forward surface to support the neck and head of a seat occupant, said base member defining at least one recessed area at a base member end, a cover enclosing said base member, attachment means on said cover for engagement with the automobile seat including a strap secured at its ends to the cover, a speaker magnet housing inset within said recessed area of the base member, said base member at least partially supporting said magnet housing, and said cover serving to retain said speaker magnet housing in said recessed area of the base member and to isolate the speaker from a user's head.

* * * * *